Feb. 11, 1930.　　　W. A. MARRISON　　　1,746,788

PIEZO ELECTRIC DEVICE

Filed Dec. 21, 1928

INVENTOR
W. A. MARRISON
BY
Guy T. Morris
ATTORNEY

Patented Feb. 11, 1930

1,746,788

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

PIEZO-ELECTRIC DEVICE

Application filed December 21, 1928. Serial No. 327,660.

This invention relates to piezo-electric devices and particularly to means for increasing the frequency range of such devices. The application is in part a continuation of application Serial No. 81,165, filed January 14, 1926.

In the design of piezo-electric devices, used as the frequency control elements in space discharge tube systems, it has been customary to prepare the piezo-active element of these devices that is, the resonator, in the form of a parallelepiped whose three dimensions are parallel with a set of optical, mechanical and electrical axes of the mother crystal. The resonator is usually arranged between metallic plates or is provided with metallic coatings upon opposite faces to which alternating electromotive forces are supplied. When so arranged, the piezo element is set into vibration by the action of the electric field between the plates or coatings. For reasons that will be made apparent shortly the resonator tends to take the form of a long thin plate having herefore two sides or faces and four edges, the electrodes being placed on the faces.

If such a resonator is cut so that its faces are parallel to one of the natural faces of the mother crystal the metallic plates or coatings being positioned as usual on the faces of the resonator, the resonator will be set into vibration only in the direction of the thickness, or in other words, only in the direction of a mechanical axis of the mother crystal. If, on the other hand, the resonator is cut so that the faces are perpendicular to one of the natural faces of the mother crystal, the electrodes again being placed on the faces, the resonator will tend to vibrate either in the direction of its thickness, and therefore in the direction of an electric axis, or in a direction transverse with respect thereto and parallel with a mechanical axis. These two modes of vibration (the former of which is also applicable to a resonator cut the other way) are due to what are known as the longitudinal and transverse effects respectively, having reference respectively to the direction of electrostatic field and a direction normal thereto.

The natural frequency of the resonator when vibrating as in accordance with the transverse effect depends upon the elastic constant of the crystalline substance, as well as its density, and its length dimension in the transverse direction. This frequency is given approximately by the equation $$F = \frac{K}{L}, \quad (1)$$

where K is a constant and L is said length. Since this is the dimension principally significant in determining the frequency for this mode of vibration, for reasons of economy it will usually be the greatest of the three dimensions and will accordingly be called the length, the value of the width and thickness being only great enough to satisfy other requirements. This accounts for the shape of resonator assumed so far. For a piezo resonator of quartz the constant K is approximately equal to 2,700,000 when L is measured in millimeters. A similar equation applies for vibrations due to the longitudinal effect, the thickness being used instead of length. Using this equation as a basis of calculation it is found that a quartz resonator in the form of a parallelepiped whose frequency is to be 1,000,000 cycles per second must be approximately three millimeters long, whereas a resonator of the same material and designed to have a natural frequency of vibration of 10,000 cycles per second must be approximately 27 centimeters in length. Obviously, it is difficult to obtain quartz or other crystals having dimensions normal to its optical axis of such magnitude as would be required, and even if they could be obtained, the apparatus employing them would be very cumbersome.

It is therefore evident that although it may be comparatively easy to design resonators having natural frequencies within the range of high radio frequencies, it has heretofore been difficult, if not impossible, to secure or design resonators in the form of a parallelepiped, particularly quartz resonators, having low natural frequencies of vibration, for example, within the range of audibility or even of frequencies of the order of those used in wire carrier transmissions.

This invention is related to application Serial No. 734,189, filed August 26, 1924, by W. A. Marrison, in that both are directed to providing means and methods for causing flexural vibrations of piezo-electric elements.

By means of the present invention, the advantages associated with the use of crystal vibrator elements or resonators having substantially the shape of the parallelepiped are retained, together with the particular advantage that the element may be vibrated at low natural frequencies.

It is an object of this invention to cause vibration of piezo-electric resonators at low frequencies.

Another object is to produce flexural vibration of piezo-electric resonators.

A feature of the invention relates to piezo-electric resonators having substantially the form of a parallelepiped, which are provided with reentrant portions or perforations for the insertion of electrodes, whereby the resonator may be vibrated flexurally.

Another feature is a means of increasing the electrode surface of a piezo-electric device for increasing the driving force applied thereto.

The invention broadly consists in so shaping the crystal resonator of a piezo-electric device and so arranging the conducting plates constituting its electrodes that forces, tending to cause flexural vibration of the resonator at low frequencies, may be applied thereto. More specifically, certain of the electrodes may have a plurality of elements and the resonator may be provided with holes or slots for the insertion of certain of the electrode elements. The slots, and hence the electrodes, are so positioned that the effects produced by the electric fields between the several electrode elements, tending to cause flexural vibration of the crystal element, are additive.

The invention is illustrated in the drawings wherein Fig. 1 is a resonator having an electrode inserted in a central slot.

Figure 1:
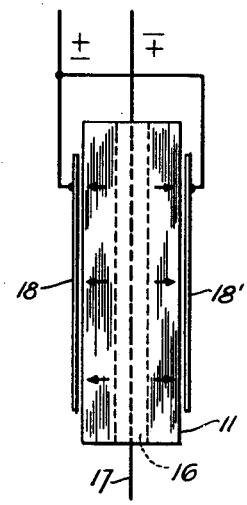
Figure 2:
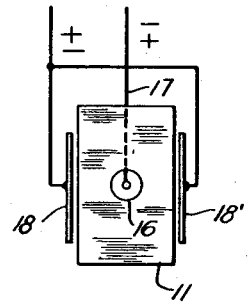
Fig. 2 is an end view of the resonator illustrated in Fig. 1.

The piezo-electric device illustrated in Figs. 1 and 2 comprises a piezo-active resonator 11 which has been cut, for example, from a natural quartz crystal. The resonator may if desired and usually would, have the general form of a parallelepiped. A slot or hole 16 is drilled substantially through the center of the resonator and an electrode 17 is positioned in the slot 16. Two other conductors 18 and 18' together effectively constituting another electrode are positioned adjacent to the opposite sides of the resonator.

In Fig. 1 the vertical dimension is what has been called the length in the statement of invention, the horizontal dimension being the thickness, the resonator therefore being shown in edgewise view. The resonator may be assumed to have been cut so that its thickness dimension is in a direction perpendicular to a mechanical axis of the natural crystal.

When alternating voltages are applied to the electrodes of the device the lines of electric force between the electrode 17 and the respective electrode elements 18 and 18' traverse the two halves of the resonator element in opposite senses or directions as shown. The stresses correspondingly set up in the direction of its length are likewise in opposite directions, tending therefore, in analogy with the more usual transverse effect, to cause a shortening of the crystal on one side and a lengthening of the crystal on the other side. The effects of the two electric fields in producing flexure are therefore additive. The resultant is an alternate bending of the crystal in opposite directions by virtue of which it vibrates flexurally at the frequency of the alternating voltage applied to the electrodes. Flexural vibrations may also be produced by an alternating voltage applied to an inner electrode and a single outer electrode. The amplitude of such vibration becomes relatively large when this frequency is substantially the same as the natural resonant frequency of the crystal element when vibrating in this mode.

It is found experimentally that a piezo crystal of convenient size can be caused to vibrate flexurally at frequencies much lower than is the case when it is caused to vibrate in virtue of the longitudinal effect, as in the usual manner, or even when it is caused to vibrate in virtue of the transverse effect in accordance with Equation (1). Of course, vibrations which are produced in virtue of the longitudinal and transverse effects are both longitudinal vibrations, as contrasted with flexural or torsional.

The frequency of flexural vibration is given by the equation $$F = \frac{K}{L^2}, \quad (2)$$

where K and L represent the same quantities as in Equation (1) above although the values of the constants K are different in the two instances. It is readily seen that for long bars a given increase in the length L lowers the frequency of flexural vibration by a much greater amount than it does the frequency of longitudinal vibration.

Figure 3:
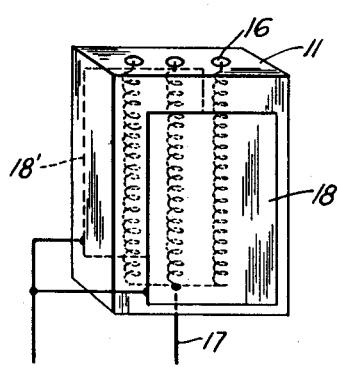
Fig. 3 illustrates a resonator similar to Fig. 1 having a plurality of internal electrodes.

The arrangement illustrated in Fig. 3 has the advantage over that shown in Figs. 1 and 2 that it enables relatively large forces to be applied to the crystal element for establishing flexural vibration. In Fig. 3, a piezo-electric device similar to that shown in Fig.

2 is illustrated. This figure shows a resonator having a plurality of holes 16 which are drilled through its medial portion. In these holes are positioned spirally formed conductors whereby the electrode surface is greatly increased. The conductors, of course, may have other shapes as desired. The increase in surface and in number of electrode elements enables greater forces to be applied to the crystal for causing it to vibrate flexurally.

Figure 4:
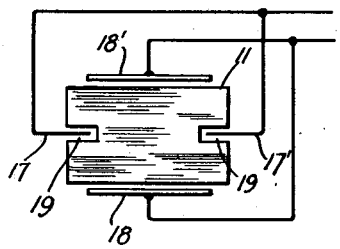
Fig. 4 illustrates a piezo resonator having electrodes inserted in lateral slots.

The piezo-electric device illustrated in Fig. 4 includes a crystal resonator element provided with lateral slots 19, which may be sawed into the sides of the resonator for the insertion of electrodes. The device illustrated in Fig. 4 operates in substantially the same manner as that illustrated in Figs. 1, 2 and 3 for causing the resonator to vibrate flexurally.

It will be obvious that many other forms of crystal element, having numerous other arrangments of slots or electrodes, may be devised in accordance with the principles set f th herein. These are clearly comprehend- within applicant's invention, which it is to be understood is limited only by the scope of the appended claims.

Where, in the claims, the terms "length" and "thickness" are used it should be understood that they refer respectively to the dimension of the resonator in the direction of a mechanical and an electrical axis and, further, that they have no implication as to the relative values of these dimensions or either of them, with respect to the remaining dimension.

What is claimed is:

1. A piezo-electric device comprising a crystal element in the form of a parallelepiped whose dimensions are parallel with a set of natural axes in the parent crystal, an electrode projected into said element, and an external electrode adjacent one of the faces of said element parallel to said projected electrode, the plane of said face being parallel to a plane determined by the optical axes and a line perpendicular to a face of the natural crystal, whereby flexural vibrations of said element are caused when alternating electric potentials are applied between said projected electrode and said external electrode.

2. A piezo-electric device comprising a crystal element in the form of a parallelepiped whose dimensions are parallel with a set of natural axes in the parent crystal, an electrode projected therein parallel with two of the faces and perpendicular to a natural face of the mother crystal, and external electrodes adjacent said faces, whereby flexural vibrations of said element are caused when alternating electric potentials are applied between said projected electrode on the one hand and the external electrodes collectively on the other hand.

3. A piezo-electric device comprising a crystal resonator in the form of a parallelepiped whose length and thickness dimensions are parallel respectively with a mechanical and an electrical axis of the natural crystal, said resonator having a reentrant cavity extending parallel to its length, an electrode in said reentrant cavity, and an external electrode adjacent each of the opposite faces of said element which are parallel to its length and separated by its thickness, said electrodes covering substantially the entire areas of said faces whereby flexural vibration of said resonator is caused when alternating electric potentials are applied between first mentioned electrode and said external electrodes.

4. A piezo-electric device comprising a crystal element in the form of a parallelepiped, two of whose faces are parallel to a plane determined by an optical and a mechanical axis of the natural crystal, an electrode internal of said element and parallel with said faces, external electrodes adjacent said faces and covering substantially their entire areas, and means for applying an alternating potential between said internal and said external electrodes collectively whereby the potentials across the portions of said element between the internal electrode and the respective external electrodes are oppositely directed.

In witness whereof, I hereunto subscribe my name this 20th day of December, 1928.

WARREN A. MARRISON.